June 16, 1936.    H. B. ELDRIDGE ET AL    2,044,067
MACHINE FOR TESTING CLUTCH ASSEMBLIES
Filed Sept. 24, 1932    3 Sheets—Sheet 1
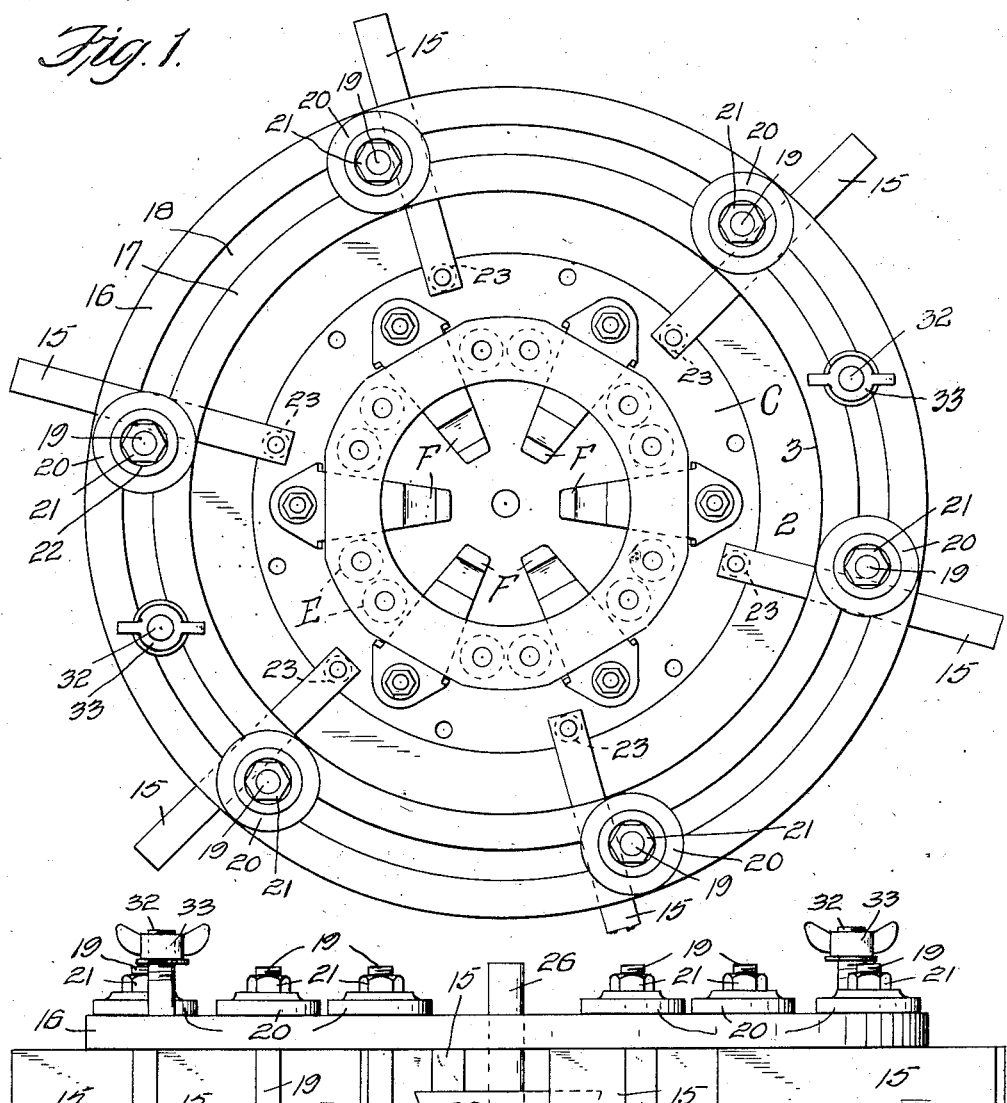
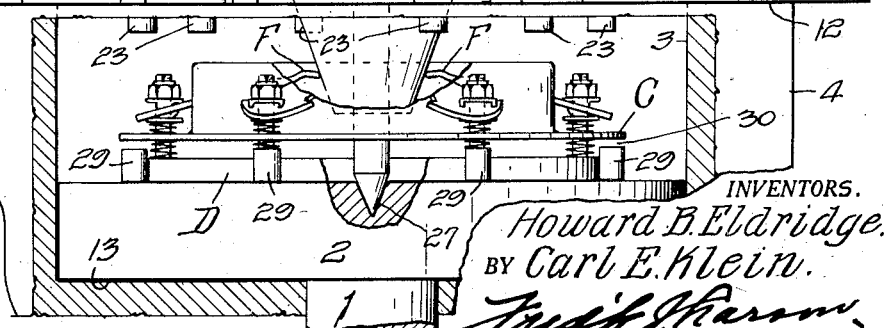
INVENTORS.
Howard B. Eldridge.
BY Carl E. Klein.
ATTORNEY.

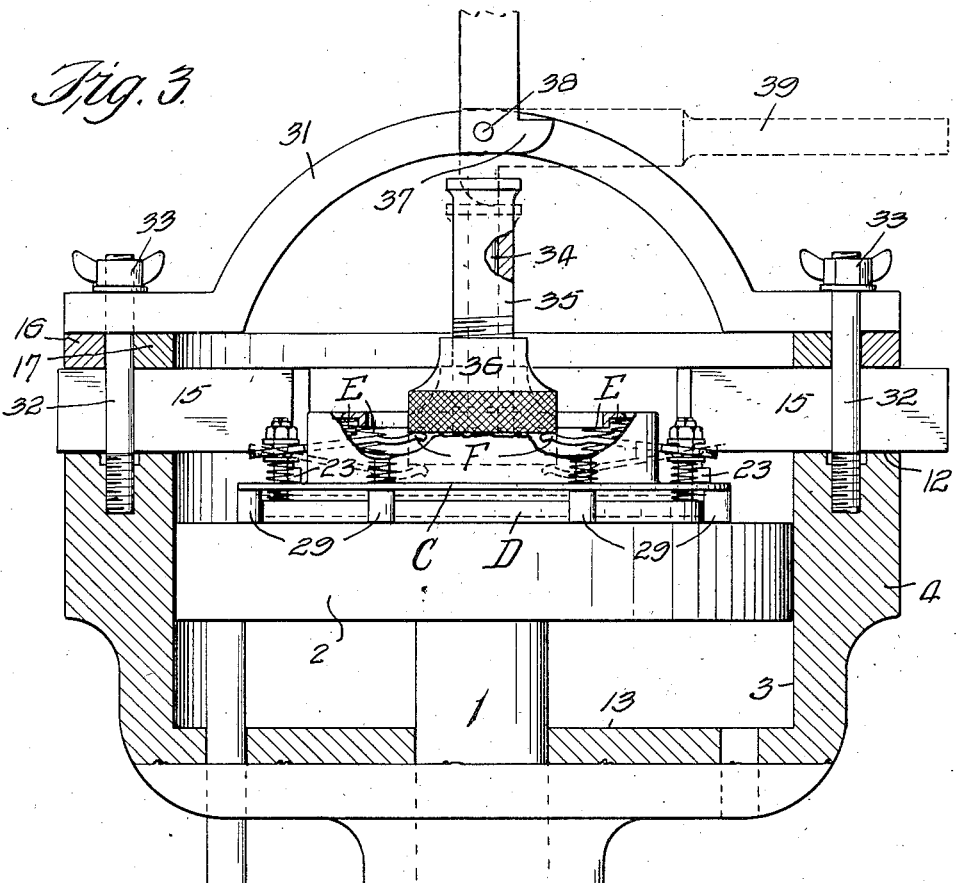
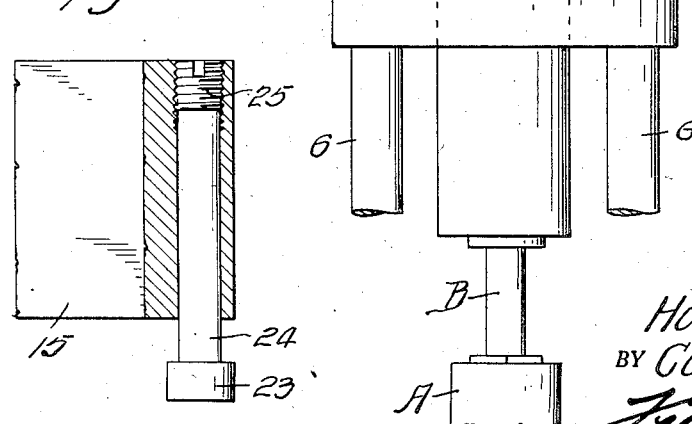

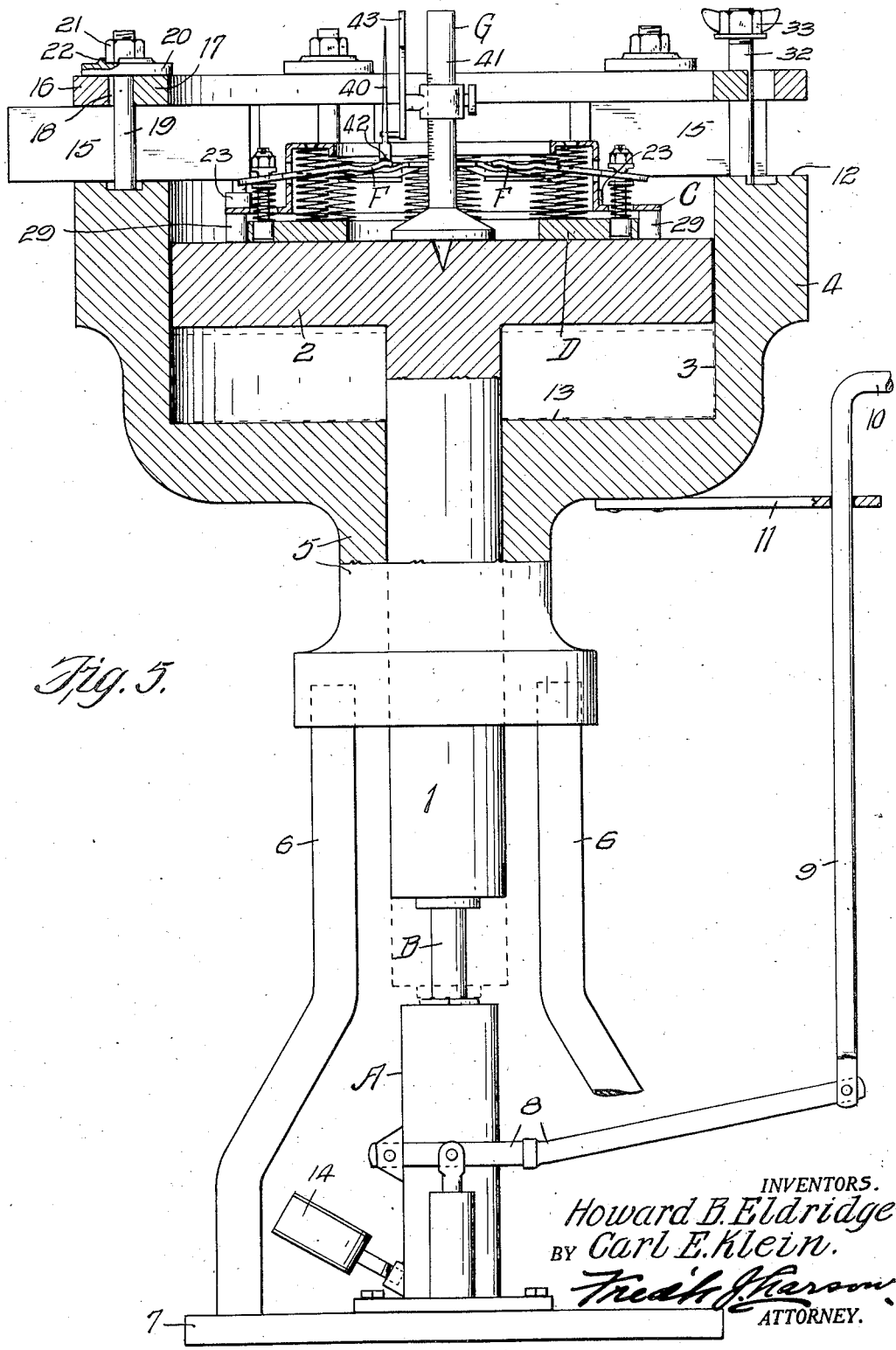

Patented June 16, 1936

2,044,067

UNITED STATES PATENT OFFICE 2,044,067

MACHINE FOR TESTING CLUTCH ASSEMBLIES

Howard B. Eldridge and Carl E. Klein, St. Louis, Mo.

Application September 24, 1932, Serial No. 634,702

14 Claims. (Cl. 33—180)

This invention relates to the method of and machine for testing cover plate clutch assemblies, and, it consists in the novel features more fully set forth in the following specification and finally pointed out in the claims appended hereto.

As is generally known, the purpose of a clutch is to transmit power from a driving force to a driven member without being a rigid or permanent part of the driving member, thus, it is the method of applying, or disengaging the power at will. Clutches are used on all automobiles, trucks, tractors and on industrial machinery where it is desired to apply or disengage power. In general, clutches are made up of cover and pressure plates spaced by pressure springs, throw-out levers and frictional discs. Like all machinery, clutch parts become worn, bent, break, burn out because of heat and warp because of heat. The efficiency of a clutch depends on the amount of frictional contact, spring pressure and finger throw-out possible in any make or design of clutch. Since clutches are disengaged by the further compressing of pressure springs from their normal compression of working setting, the ideal clutch, is, of course, one which disengages with the least amount of additional spring compression over the maximum amount of pressure possible in any given set of clutch pressure springs.

Clutches are known as being of a single or multiple disc design and they are constructed to fit, in most instances, in a limited amount of space, so that the method of applying pressure in most clutches is by a separate unit known as a cover assembly, and, cover assemblies are of many designs, but the principle in each case is to regulate the amount of pressure and throw-out possible in a given unit, regardless of the design of the clutch, whether of separate parts, or complete units.

Our method of and machine, or apparatus for testing clutch assemblies are applicable to all sizes and models of cover and pressure plate clutch assemblies, the testing operations do not require the services of skilled mechanics and clutches can be serviced to meet regular or special demands and conditions, and during testing operations, the operator of the machine can readily determine any tight or worn parts in the assembly, which in the present method of reconditioning clutches, would not be observed.

As satisfactory operation of any type of clutch assembly is absolutely dependent upon accurate adjustment of throw-out, or release lever fingers, they must be adjusted in a plane at the desired height, and in parallel relation to the cover plate, pressure plate and discs of the assembly, and, this is readily possible by the method and machine herein disclosed.

It is therefore, an object of our invention to provide a method of and a machine to accurately test the cover and pressure plate clutch assembly to show up any errors in the assembly to be corrected, such as weak pressure springs, worn or tight parts and non-parallelism of throw-out or release lever fingers with relation to the cover and pressure plates of the clutch assembly, regardless of its method of mounting or attaching to the machinery in which it is used.

A further object of the invention is to provide a machine that will permit of a clutch assembly being accurately tested and adjusted; briefly, first, as to the centering of position of the clutch assembly on the surface plate of the machine; second, testing by pressure the throw-out or release lever spring tension and as to tight or worn parts; and, third, gauging the throw-out or release lever fingers as relates to height accuracy of the lever fingers from the pressure plate of the clutch, to ascertain which fingers, if any, are not properly positioned as to height from the pressure plate, thus ascertaining those which need adjustment so as to lie parallel with the surface and cover plates and in a plane with each other, and to properly adjust same to the correct setting.

A further object of the invention resides in a machine wherein a surface plate is moved vertically by a plunger which is moved in one direction by pressure exerting means and by gravity in a reverse direction.

A still further object of the invention is to provide a machine having a plunger provided with a surface plate adapted to support a clutch assembly to be tested and adjusted, and stationary means against which the cover plate of the clutch engages when upward pressure is imparted to the plunger for compressing the pressure springs between the cover plate and the pressure plate of the clutch assembly a predetermined distance, which is controlled by spacer members representing various unit mounting heights and which are disposed between the surface plate and the edge portion of the cover plate of the clutch assembly.

A still further object of the invention resides in the provision of a method and means for testing and adjusting clutch assemblies, which possesses advantages in points of simplicity, accuracy and efficiency of operation, and, which at the same time is simple and durable in construction.

Further advantages will be better apparent from the detailed description of the invention when read in connection with the drawings, in which:

Fig. 1 is a top plan view of a machine embodying the features of the invention, there being a clutch assembly positioned thereon.

Fig. 2 is a view partly in side elevation and partly in sectional elevation of the upper part of the machine and showing the means for centering a clutch assembly on the surface plate thereof.

Fig. 3 is a view partly in side elevation and partly in sectional elevation of the upper part of the machine and showing the means for moving the throw-out lever of the clutch assembly into working position for testing the tension of the pressure springs and locating tight and worn parts.

Fig. 4 is a detail of one end of the stop.

Fig. 5 is a view partly in side elevation and partly in sectional elevation of the machine and showing the means for gauging the height of the throw-out fingers of the clutch assembly.

In carrying out one form of the invention, there is employed a suitable hydraulic or similar lifting jack of the conventional type designated generally as A, on the ram B on which is seated a suitable ram 1, the upper end of which is provided with a suitable surface plate 2. The surface plate 2 is mounted for vertical up and down movement within the bore 3 of a suitable cylinder 4 and the ram is guided for sliding movement in a suitable bearing 5 depending from the cylinder 4. The cylinder 4 may be supported by means of a plurality of suitable legs 6 having connection at their lower ends with a suitable base plate 7 to provide a pedestal or support and the base plate 7 is shown as supporting the hydraulic jack A. The hydraulic jack A includes a fulcrumed operating lever 8 for actuating the jack ram B, and the lever 8 in turn is actuated by means of rod 9 having a handle 10. The rod 9 is guided in its pumping action by means of a suitable guide 11 secured to and extending from the wall of the cylinder 4, as is evident from Fig. 5 of the drawings.

The upper face of the wall of the cylinder, designated 12, is adapted to be smooth and lie substantially parallel with the surface plate 2, mounted for movement in the cylinder 4. The bottom 13 of the cylinder bore serves as a stop for downward movement of the surface plate 2, which is brought about by gravity when pressure in the jack has been released. A pressure gauge 14 has connection with the lower end of the hydraulic jack A to indicate the amount of pressure on ram 1.

A plurality of suitably spaced radially disposed stop blocks or members designated 15 are selectively seated upon the upper end surface 12 of the cylinder 4. Mounted, or seated upon these stop blocks 15 are a pair of suitably spaced rings designated 16 and 17 through which space between the rings, which is designated 18, a plurality of screw threaded studs 19, anchored to the cylinder wall 4 pass upwardly to a point above the rings 16 and 17. A suitable washer 20 receives the upper ends of the studs 19 and the washers 20 are seated upon the rings 16 and 17. Each stud 19 is provided with a securing nut 21, the lower end of which is receivable in a recess 22 in the upper face of its respective washer 20. Said rings, washers and nuts are employed for the purpose of clamping the stop blocks 15 against displacement on the cylinder 4 in their selected and adjusted positions by drawing the nuts down tightly against the washers 20 and the washers against the rings 16 and 17.

The stop blocks 15 are each provided near their inner end with a clutch cover plate contact head 23 as an integral part of a non-screw threaded stem 24 which is frictionally inserted into the block for upper end contact with a downwardly directed adjusting screw 25 for lowering the clutch cover plate contact heads 23 should it be necessary to do so to cause all of them to properly contact with the cover plate C of a clutch assembly seated upon the surface plate 2, and when the surface plate 2 is raised to exert the desired pressure for clamping the clutch at its rim edge, non-compressed, between the pressure plate D and the heads 23 on the stop blocks 15.

Associated with the machine is a removable clutch assembly centering device for centering a clutch assembly on the surface plate 2 of the machine. This device consists of a post or stem 26, the lower end of which is receivable in a recess 27 central of the surface plate 2 of the machine, as clearly shown in Fig. 2, of the drawings. Slidably mounted upon the stem 26 is a conically shaped member 28 to be accommodated between the ends of the fingers of the throw-out or release levers F of the clutch to center any size or model of cover or pressure plate type of clutch assembly on the surface plate 2. After the clutch assembly has been centered on the surface plate the centering device is removed.

The next step in the operation of the machine in carrying out this method of testing and adjusting clutch assemblies in the reconditioning thereof, is the placing of a plurality of height sleeves or spacer members 29 upon the surface plate 2 below the cover plate C of the clutch assembly and adjacent the edge thereof. These spacers are of various heights for various models of clutch assemblies and in every instance, there is a predetermined clearance designated 30, between the spacers and the inner face of the cover plate C of the clutch assembly before the surface plate has been raised by means of the jack A through the medium of the ram 1 to bring the upper face of the cover plate C into contact with the stops 15, after which further movement of the ram and surface plate will cause the pressure springs E to compress the distance of said clearance, thereby taking up the clearance between the spacers and the cover plate of the clutch assembly to prevent further compression of the pressure springs of the clutch assembly.

The throw-out or release lever testing means embodies a cross-member or yoke 31 which is detachably connected at its ends to the spaced rings 16 and 17 of the machine, by means of screw threaded studs 32 and securing nuts 33, as shown in Fig. 3. This device is readily applied or removed from the machine.

A post, or stem 34 is secured to and depends from the yoke 31 centrally of and in axial alignment with the surface plate 2 of the machine. Slidably mounted on the stem 34 is a sleeve 35 having a head 36 at its lower end, which head is adjustable relative to the sleeve 35 due to the fact that it has screw threaded connection therewith. This sleeve and head are moved downwardly a predetermined distance to lie at a known height from the pressure plate 2, by means of a suitable cam 37, which cam is pivoted, as at 38, to the yoke 31 and the cam is actuated by means of a suitable operating lever 39. The head 36 of this device is adapted to engage the upper surface of the fingers of the throw-out or release levers F and movement of the cam 37 causes the head 36 to depress the release lever fingers the desired distance to raise the pressure plate from the surface plate to test the desired amount of possible throw-out or release of the clutch. The fingers are released several times causing them to set or return to their normal or most used position for accurate setting.

After this operation, or step, the yoke 31 with its connnected parts is removed from the machine and a suitable test gauge designated generally, as G, is positioned upon the surface plate 2, centrally thereof, and passes through the opening of the clutch to be surrounded by the throwout or release lever fingers F of the clutch assembly. The indicator arm 40 of the test gauge G is adjustable up and down on the post 41 of the gauge device so that the lower end 42 of the indicator arm 40 is at the required or recommended height from the surface plate 2. Prior to, or subsequent to the positioning of the test indicator G on the surface plate 2, the operator actuates the jack A raising the surface plate 2 the desired distance to cause the rim of the cover plate C to contact with the stop blocks 15 and the pressure is then further applied to the clutch assembly by the jack A through the medium of the ram 1 and surface plate 2 to compress the pressure springs E, which pressure is predetermined and observed through the medium of the pressure gauge 14 attached to the hydraulic jack A. The required pressure to properly test the tension of the pressure springs E varies for different models and sizes of clutch assemblies, as the tension of pressure springs E vary in the different models of clutches, but it is known for each model or type of automotive clutch.

After the pressure springs E of the clutch assembly have been compressed as described, the distance of the upper plane of each throw-out or release lever finger is tested and gauged with the test indicator arm 40 pointing to graduations on a plate 43 and when one release lever finger is lower or higher than another, or not of the required height from the surface plate 2, the throw-out or release lever F is adjusted by tightening or loosening the usual nuts to bring the plane of the fingers to the required height, so that the upper faces of all throw-out fingers will lie in a plane and parallel with the cover and pressure plates of the clutch assembly after the assembly is removed from the surface plate 2 of the machine.

From the foregoing description, it is evident that our method of and machine for testing and servicing automotive clutches, enables us first to test the tension of the pressure springs at working position, then simultaneously test the accuracy of the release levers to see whether they are tight, or worn, while the pressure springs are in compressed position, and then individually gauge the inner ends of the release levers to indicate the alignment thereof or the height thereof relative to the surface plate upon which the clutch asembly is seated.

The many advantages of the herein described invention will readily suggest themselves to those skilled in the art to which it appertains.

While there has been shown and described a preferred form of machine for carrying out the method of testing clutch assemblies, it is to be understood that we do not desire to restrict, or limit ourselves to the very details of the construction shown and described, which is merely illustrative, it being obvious that changes, not involving the exercise of invention, may be made without conflicting or departing from the spirit of the invention within the scope of the appended claims.

What we claim is:

1. In combination, means comprising a base member, means mounted in the base member for reciprocating motion, members secured to the base member and overlying the reciprocating member, and vertically adjustable members supported on the inner ends of the overlying members adapted to contact the cover flange of a clutch when clamped between said reciprocating member and the adjustable members.

2. In a device of the class described having, in combination, a stand having a cylindrically recessed upper end, a surface plate mounted for reciprocating motion in the cylindrical recess, radially disposed arms clamped to said stand and overlying the surface plate, and vertically adjustable pins carried by and depending from the inner ends of the arms.

3. In a device of the class described, having in combination, a stand having a cylindrically recessed upper end, a surface plate mounted for reciprocating motion in the cylindrical recess, radially disposed arms clamped to the stand and overlying the surface plate, vertically adjustable pins carried by and depending from the inner ends of the arms, a yoke removably secured at opposite ends to the upper end of the stand, a pin secured to and depending from the yoke, a sleeve mounted on the pin, a member screw threadedly mounted on the lower end of the sleeve, a lever pivoted to the yoke, and a cam surface on the lever adapted for engagement with the upper end of the sleeve for moving it downwardly upon the pin when the lever has been moved from an inoperative position to an operative position.

4. A clutch testing device having, in combination, a stand having a chamber formed in the upper end to provide a rim therefor, a surface plate mounted for reciprocating motion within the chamber and upon which a clutch is adapted to be seated for testing the same, pillow blocks adapted to be supported by the surface plate, radially disposed arms mounted upon the rim of the stand and overlying the surface plate, means for clamping the arms against displacement, and vertically adjustable pins carried on the inner ends of the arms between which pins and the surface plate the clutch is clamped when the surface plate is in its uppermost position.

5. A clutch testing device having, in combination, a stand having a chamber formed in the upper end to provide a rim therefor, a surface plate mounted for reciprocating motion within the chamber and upon which a clutch is adapted to be seated for testing the same, pillow blocks adapted to be supported by the surface plate, radially disposed arms mounted upon the rim of the stand and overlying the surface plate, means for clamping the arms against displacement, vertically adjustable pins carried on the inner ends of the arms between which pins and the surface plate the clutch is clamped when the surface plate is in its uppermost position, a yoke removably suported above the arms and spanning the cylindrical chamber, a lever pivoted to the yoke, a pin depending from the yoke, a sleeve mounted on the pin, exterior screw threads on the lower end of the sleeve, and an internally screw threaded clutch actuating finger engaging member mounted on the lower screw threaded end of the sleeve.

6. A device for servicing automotive clutches and the like having a flanged cover plate, a pressure plate and release levers, comprising a base member, a surface plate reciprocably mounted within the base member, members secured to the base member and overlying the surface plate, means for elevating the surface plate with the clutch seated thereon to clamp the rim of the clutch between the overlying members and pillow blocks seated on the surface plate, a cross member secured to the base member, a lever pivoted to said cross member, and means adapted to be seated upon the inner ends of the release levers and forced downwardly by the lever for depressing the inner ends of the release levers to raise the pressure plate from the surface plate to determine whether or not the pressure plate raises parallel with the surface plate.

7. A device for servicing automotive clutches having a cover plate, a pressure plate, pressure springs and release fingers, comprising the combination of means for supporting a clutch and overlying means for clamping the clutch in position therebetween to be tested, and lever actuated pressure means carried by a portion of the clamping means for simultaneously depressing the release fingers to raise the pressure plate from the clutch supporting means to determine whether or not the pressure plate raises parallel to the clutch supporting means.

8. A device for servicing automotive clutches having a cover plate, a pressure plate, pressure springs and release fingers, comprising, in combination, a reciprocably mounted clutch supporting member and a series of overhead stops spaced therefrom for clamping the clutch therebetween, supporting means disposed above the clamping means, and pressure applying means carried thereby engaging the inner ends of all the release fingers for simultaneously depressing the inner ends of the release fingers to raise the pressure plate from the clutch supporting member.

9. A device for servicing automotive and like clutches having a cover plate, a pressure plate, pressure springs and release fingers, comprising a base member, clutch supporting means reciprocably mounted therein, overlying members secured to the base member to co-act with the clutch supporting member to clamp a clutch therebetween, an overhead support, and means carried thereby for simultaneously depressing the inner ends of the release fingers to raise the pressure plate from the clutch supporting means to determine whether or not the pressure plate raises parallel thereto.

10. A device for servicing automotive and like clutches having a cover plate, a pressure plate, pressure springs and release fingers comprising, in combination, a stand, a ram mounted on the stand, a surface plate on the ram and upon which a clutch is adapted to be positioned, means for raising and lowering the ram, pillar blocks adapted to be positioned on the surface plate below the rim of the cover plate and to engage the underface of the cover plate rim when the ram is raised, overhead stops on the stand adapted to engage the upper face of the cover plate rim for clamping a clutch upon the surface plate without compressing the pressure springs when the ram has been raised, an overhead member secured to and spanning the stand above the stops, a pin secured to and depending from said member in axial alignment with the surface plate, and the clutch between the surface plate and the overhead stops, an externally screw threaded sleeve mounted on the pin, an internally screw threaded gauge member adjustably mounted on the lower end of the sleeve, a lever having a cam face pivoted to the overhead member, said lever when in one position being inactive but when moved to another position being applied thereto exerts pressure against the sleeve, moving the sleeve and the gauge member as a unit downwardly upon the depending pin to depress the inner ends of said release fingers, thereby raising said pressure plate from said surface plate to determine whether or not the pressure plate raises in parallel relation to the surface plate.

11. In combination, means comprising a base member, reciprocable means mounted on the base member adapted to support a clutch to be tested, and a series of members overlying the reciprocable means secured to the base member to clamp the clutch between the reciprocable means and the overlying members when the reciprocable means has been raised to an operative position from an inoperative position.

12. A device for servicing automotive and like clutches having a flanged cover plate, a pressure plate, pressure springs and release levers, comprising a pedestal, a plunger reciprocably mounted on the pedestal and upon which a clutch is adapted to be seated to be tested, a series of radially disposed members mounted on and disposed above the plunger and between which members and the plunger the clutch is clamped at the flange of the cover plate when the plunger is raised, a predetermined distance, a pair of spaced concentrically arranged rings mounted on said radially disposed members, and fastening devices secured to the pedestal for clamping the radially disposed members in operative position.

13. A device for servicing automotive and like clutches having a flanged cover plate, a pressure plate, pressure springs and release levers, comprising a pedestal, a plunger reciprocably mounted on the pedestal and adapted to support a clutch to be tested, a series of radially disposed members mounted on the pedestal and projecting above the plunger between which members and said plunger and the clutch is clamped when the plunger is raised a predetermined distance, a clamping ring mounted on the radially disposed members, stud bolts secured to the pedestal and nuts carried by the stud bolts for holding the clamping ring against the radially disposed members to prevent displacement thereof.

14. A device for servicing automotive and like clutches having a flanged cover plate, a pressure plate, pressure springs and release levers, comprising a support, a plunger mounted on the support upon which a clutch is adapted to be seated to be tested, a series of stop blocks individually mounted on the support above the plunger between which members and the plunger the clutch is clamped when the plunger is raised a predetermined distance, means including a clamping member and a series of fastening devices carried by the support for clamping the radially disposed stop block in operative position, said fastening devices including stud bolts secured to the support and carrying nuts engageable with the clamping ring, an arched member mounted at its ends on the clamping ring, means for securing the arched member in operative position, a pin depending from said arched member, a sleeve mounted on the pin, a release lever engaging member adjustably secured to the lower end of the sleeve, and a cam lever pivotally supported by the arched member for simultaneously depressing the inner ends of the release levers, compressing the pressure springs and raising the pressure plate from the plunger.

HOWARD B. ELDRIDGE.
CARL E. KLEIN.